United States Patent [19]

Nagai et al.

[11] 3,909,449

[45] Sept. 30, 1975

[54] METHOD FOR THE PRODUCTION OF ACTIVATED CARBON SPHERES

[75] Inventors: Hirosi Nagai, Chofu; Kunihiko Katori, Tokyo; Zenya Shiiki, Tokyo; Yasuo Amagi, Tokyo, all of Japan

[73] Assignees: Kureha Kagaku Kogyo K.K., Nihonbashi; Toyo Boseki Kabushiki Kaisha, Osaka, both of Japan

[22] Filed: Apr. 24, 1974

[21] Appl. No.: 463,602

[30] Foreign Application Priority Data
Apr. 26, 1973 Japan................................ 48-46661

[52] U.S. Cl. ................ 252/422; 252/428; 252/438; 252/439; 252/440; 252/444; 252/445; 252/447; 423/212; 423/213.2; 210/40
[51] Int. Cl.² ...................... B01D 15/00; F01N 3/00
[58] Field of Search ........... 252/447, 445, 439, 440, 252/438, 428, 422; 423/449

[56] References Cited
UNITED STATES PATENTS

| | | | |
|---|---|---|---|
| 3,502,427 | 3/1970 | Johswich.......................... | 252/445 X |
| 3,617,505 | 11/1971 | Cole et al. ....................... | 252/444 X |
| 3,661,503 | 5/1972 | Didchenko et al. ............. | 423/447 X |
| 3,775,344 | 11/1973 | Amagi et al. ..................... | 252/444 |
| 3,776,829 | 12/1973 | Goan .............................. | 423/447 X |
| 3,786,134 | 1/1974 | Amagi et al. ..................... | 423/449 |

*Primary Examiner*—Patrick P. Garvin
*Attorney, Agent, or Firm*—Lane, Aitken, Dunner & Ziems

[57] ABSTRACT

Spheres of activated carbon are obtained by melting and mixing 100 parts by weight of pitch with 10 to 50 parts by weight of an aromatic solvent compatible with said pitch and 0.01 to 1 part by weight of a metal compound, molding the resultant molten mixture to form a plurality of spheres, immersing the formed spheres in an organic solvent which is compatible with said aromatic solvent and destitute of affinity for said pitch to extract said aromatic solvent from said spheres, infusibilizing the resultant porous pitch spheres having micro-pores and thereafter activating the porous pitch spheres in an atmosphere of ammonia gas at the temperature of 550 to 1000°C. The activated carbon spheres thus produced are particularly useful as activated carbon for the desulfurization of a sulfurous acid gas-containing combustion exhaust gas and for treatment of waste liquor from a sulfite pulp process.

9 Claims, No Drawings

3,909,449

METHOD FOR THE PRODUCTION OF ACTIVATED CARBON SPHERES

FIELD OF THE INVENTION

This invention relates to a method for the production of activated carbon spheres from a pitch raw material. More particularly, this invention relates to a method for the production of activated carbon spheres which function with high efficiency particularly when used for the desulfurization of a sulfurous acid gas-containing combustion exhaust gas.

BACKGROUND OF THE INVENTION

In order to prevent pollution resulting from the release of combustion exhaust gases containing sulfurous acid into the atmosphere, a method has recently been tested whereby the combustion exhaust gases are treated to remove the sulfurous acid gas by contact with activated carbon. With this method, since the sulfurous acid gas contained in the combustion exhaust gas is adsorbed in the form of sulfuric acid on the activated carbon, it is essential that the activated carbon possess both the adsorption capability peculiar to activated carbon and catalytic activity for conversion of the sulfurous acid gas present in the combustion exhaust gas into sulfuric acid through reaction with the oxygen and water present in the combustion exhaust gas. Such activated carbon should also possess high mechanical strength. However, the conventional activated carbon available for combustion exhaust gas desulfurization is generally produced by pelletizing powdered charcoal and is deficient in mechanical strength and subject to disintegration to powder. Moreover, it does not possess any appreciable catalytic activity.

Accordingly, a need exists for provision of activated carbon which has high mechanical strength and excellent catalytic activity.

SUMMARY OF THE INVENTION

It is, therefore, an object of this invention to provide a method for the production of activated carbon which possesses excellent catalytic activity and at the same time exhibits high mechanical strength. Other objects of the present invention will become apparent from the following description of the invention.

It has now been discovered that activated carbon having both high mechanical strength and high catalytic activity can be obtained by melting and mixing pitch with a suitable aromatic solvent and a metal compound capable of catalyzing a reaction between the pitch and ammonia added thereto, molding the resulting molten mixture into spheres, extracting from the formed spheres the aforementioned solvent to produce porous pitch spheres, then infusibilizing the porous pitch spheres and thereafter subjecting the spheres to activation in an atmosphere of ammonia gas.

More specifically, this invention concerns a process which is characterized by the steps of melting and mixing 100 parts by weight of pitch with 10 to 50 parts by weight of an aromatic solvent compatible with said pitch and 0.01 to 1 part by weight of a metal compound, molding the resulting molten mixture into shape of spheres, immersing the spheres in an organic solvent which is compatible with the aromatic solvent but which shows no affinity for the pitch to thereby extract the aromatic solvent to produce porous pitch spheres, infusibilizing the porous pitch spheres and thereafter activating the spheres in an atmosphere or ammonia gas at 550° to 1000°C.

DETAILED DESCRIPTION OF THE INVENTION

The pitch used as the starting material for the process of the present invention may be of petroleum origin or coal origin. In the case of a pitch having a low softening point, however, there is a possibility that, in the course of molding the pitch mixture into spheres, the formed spheres will become fused to one another. The pitch, therefore, should preferably have a softening point of not less than 70°C, and most preferably in the range of from 70° to 250°C, an H/C ratio (atomic ratio) of not more than 1, and preferably in the range of from 0.2 to 1.0 and a nitrobenzene insoluble content of not more than 25%. Such pitch can be obtained, for example, by thermally treating a petroleum hydrocarbon such as a crude oil, asphalt, heavy oil, light oil, kerosene or naphtha at a temperature in a range of 400° to 2000°C for about 0.001 to 2 seconds to produce a tarry substance and then removing from the tarry substance low molecular components by distillation, extraction or some other operation. A similar pitch can be obtained by subjecting coal tar to a suitable heat treatment and thereafter removing low molecular components. It is also possible to produce a satisfactory pitch by subjecting a waste pitch from oil refining to additional treatments such as heat treatment and oxidation. These pitches have heretofore been regarded as wastes and have found only limited use as fuel. Accordingly, the present invention, which produces an activated carbon of high quality from such waste pitch, represents a significant contribution to the efficient utility of petroleum resources.

The aromatic solvent which is admixed with the pitch to form spheres in accordance with the present invention must be compatible with the pitch. Use of an aromatic solvent having a boiling point in a range between 70° and 250°C is particularly preferred. Such an aromatic solvent is generally selected from among benzene, toluene, xylene, naphthalene, tetralin and methyl naphthalene. Use of a naphthalene as the aromatic solvent is preferred. A naphtha fraction containing naphthalene or a BTX fraction may also be used as the aromatic solvent.

The metal compound which is added to the pitch in combination with the aforementioned aromatic solvent in accordance with the present invention should function to catalyze the reaction between the ammonia and the pitch spheres during the activation treatment. Therefore, the metal compound must meet three requirements: (1) It should offer high catalytic activity in the aforementioned reaction, (2) it should remain stable through out the whole course of the production of activated carbon spheres (as, for example, against reduction to metal) and (3) it should be insoluble in the organic solvent which is used for extracting the aromatic solvent from the formed spheres. Examples of metal compounds which are usable for the purpose of the present invention include sulfides, sulfates, oxides, nitrates and acetates of such metals as Fe, Co, Ni, Cu, V, Mn, Cr, Mo, W and Bi. Among the oxides, oxides of V, Mo and W are particularly preferred because they provide high resistance to reduction.

The various operative steps of the invention will now be described in detail. 1. Melting and mixing the pitch with the aromatic solvent and metal compound:

The pitch, aromatic solvent and metal compound are mixed together and heated. In mixing, it is necessary to add 10 to 50 parts by weight of the aromatic solvent and 0.001 to 1 part by weight of the metal compound to 100 parts by weight of the pitch. If the proportions of the three components fall outside these ranges, activated carbon spheres having the desired properties are not obtainable. This mixing of the pitch, aromatic solvent and metal compound may satisfactorily be conducted in an autoclave provided with a stirring blade or a closed kneader. If the temperature at which the components are melted and mixed is too high, there is a possibility that a secondary reaction will occur between the metal compound and the pitch. It is, therefore, preferable that the temperature be maintained in a range of 100° to 200°C. 2. Molding the resultant molten mixture into the shape of spheres:

The molding of the molten mixture into the shape of spheres may be effected by any method available. For example, as disclosed in German Offlengenschrift 2,202,174, the molten mixture can be dispersed at a temperature of 50° to 350°C under pressure, in the water containing, as a suspending agent, one or more members selected from the group consisting of partially saponified polyvinyl acetate, polyvinyl alcohol, methyl cellulose, carboxymethyl cellulose, polyacrylic acid and salts thereof, polyethylene glycol and ether derivatives thereof and ester derivatives thereof, starch and gelatine and similar other watersoluble high molecular, to form dispersed compounds spheres and then cooled to solidify the formed spheres. It is also possible to form spheres from the mixture by introducing the molten mixture dropwise into a suitable liquid such as water. Alternatively, the molten mixture may be cast in a fixed metal die and then cooled to produce spheres. As to the size of the spheres thus produced, it is preferred that the spheres have a particle diameter in a range of from 0.1 to 10 mm, to facilitate extraction of the aromatic solvent from the formed spheres. 3. Extracting the aromatic solvent from the spheres obtained as described above:

The aromatic solvent contained in the formed spheres is extracted from the spheres by immersing the spheres in an extractant which is an organic solvent compatible with the aromatic solvent but destitute of affinity for the pitch. Examples of organic solvents which are usable for the purpose of this step include alcohols such as methanol, ethanol and propanol and paraffinic hydrocarbons such as hexane, heptane and light naphtha. Among these organic solvents, solvent naptha is most desirable. In extracting the aromatic solvent from the spheres by use of such an organic solvent, for example, it is sufficient to immerse the spheres in the organic solvent at normal room temperature. The immersion may be quiescent or may be accompanied by vibration or circulation of the extract. Subsequently the spheres are recovered and separated from the organic solvent extractant. The pitch spheres thus obtained have a microporous structure.

4 Infusibilizing the porous pitch spheres produced as described above:

The porous pitch spheres obtained as described above are "infusiblized" by treatment with an oxidative aqueous solution or in an atmosphere of an oxidative gas. The oxidative aqueous solution may be an aqueous solution containing any of the known oxidizing agents such as, for example, nitric acid, sulfuric acid, chromic acid (potassium dichromate plus sulfuric acid), permanganates and hypochlorous acid. As the oxidative gas, it is suitable to use oxygen, air, nitrogen oxide or a mixture thereof or a mixture of nitrogen with any one of the gases mentioned. When the infusibilization is effected by using an oxidative aqueous solution, there is a possibility that the metal compound contained in the porous pitch spheres will be dissolved out into the oxidative aqueous solution. For this reason, use of an oxidative gas is more desirable. From the economic point of view, it is most desirable to use air as the oxidative gas. As apparatus for infusiblization, either a rotary kiln or a fluidized-bed type system is suitable. To avoid cohesion or fusion together of the porous pitch spheres, it is desirable to elevate the temperature of the infusibilizing system from the neighborhood of normal room temperature to about 300°C at substantially a uniform rate of increase. In this manner, infusibilized porous pitch spheres can be obtained.

5 Activating the infusibilized porous pitch spheres in an atmosphere of ammonia gas:

In this step the infusibilized porous pitch spheres are acted upon by ammonia at an elevated temperature so as to calcine and activate the spheres and at the same time combine ammonia with the carbon atoms of the pitch to produce to activated carton spheres rich in nitrogen and having high catalytic activity. In ths step, the metal compound contained in the porous pitch spheres acts as a catalyst and serves to greatly accelerate the reaction. This acceleration of the aforementioned reaction by the metal compound results in a loss in weight in the porous pitch spheres. Thus, the degree of this loss in weight during activation serves as a yardstick for measuring the extent to which the aforementioned reaction has proceeded. Activated carbon spheres capable of satisfying the objects of this invention must undergo a weight loss of not less than 15% during this step. In the absence of the aforementioned metal compound, the reaction does not proceed satisfactorily and the loss in weight is only on the order of 5% or less, making it infeasible to produce activated carbon spheres having required durability. As the activating gas for this reaction, ammonia gas or a mixture of ammonia gas with one member selected from the group consisting of air, oxygen, steam, nitrogen and hydrogen may be used. The temperature at which the activation is conducted should preferably fall in a range of from 550° to 1000°C, and most preferably 550 to 800°C. When the activation is performed at a temperature below the lower limit 550°C, the aforementioned reaction does not proceed satisfactorily. A temperature exceeding the upper limit 1000°C is undesirable, because the loss of nitrogen and hydrogen occurs rapidly at such temperatures. A rotary kiln or a fluidized-bed type is suitable as apparatus for this activation step.

The desired activated carbon spheres are obtained by carrying out the steps (1) through (5) sequentially in the order described. Where it is necessary to produce activated carbon spheres having a large inner surface area, a step preliminary activation may be added prior to the step (5). Where activated carbon spheres produced at the end of the step (5) do not have a sufficiently large inner surface area, a post-activation step can also be added.

a. Preliminary activation:

This preliminary treatment, which is performed prior to the aforementioned step (5), provides the infusiblized porous pitch spheres obtained in step (4) with a slight degree of activation to enlarge the inner surface area of the spheres and at the same time ensure an accelerated reaction between the pitch spheres and ammonia during the subsequent step (5). In the preliminary activation of this step, it is most suitable to use steam or a mixture of steam and nitrogen as the activating gas. The temperature at which this preliminary activation is performed should preferably fall in a range of from 800° To 1000°C. A temperature range between 850° and 950°C is particularly suitable where the preliminary activation is performed with steam. Since this step is solely intended as a preliminary treatment for the activation with ammonia, it is preferred to control the degree of activation so that the loss in weight of the pitch spheres during activation will not exceed 50%. When the aforementioned step (5) is performed subsequent to the completion of such preliminary treatment, the temperature at which the activation is performed should be in a range of from 700° to 1000°C. As apparatus for the preliminary activation, either a rotary kiln or a fluidized-bed type system proves similar to that used in step (5) is suitable.

b. Post-activation:

This step is optionally performed for the purpose of further activating the ammonia-activated carbon spheres obtained at the end of step (5) where the spheres thus formed are not found to have a sufficiently large inner surface area. For the purpose of further activation, steam or a mixture of steam with nitrogen proves to be most suitable as the activating gas. Both the apparatus process parameters employed are recommended above for the step (a) preliminary activation.

According to the present invention, activated carbon spheres similar in appearance to beads can be obtained by carrying out the various steps described above in the order mentioned. The activated carbon spheres have high mechanical strength and resist communication when used under normal conditions. As will be seen from the preferred embodiments described below, these carbon spheres have a higher capacity for $SO_2$ adsorption than conventional activated carbon products and they can easily be regenerated. Thus, they prove particularly advantageous for use in the desulfurization of combusion exhaust gas containing sulfurous acid gas. In addition, these activated carbon spheres can effectively be used for treating the waste liquor from a sulfite pulp process or for deodorizing plate effluents.

This invention will be described in more detail with reference to a working example which is intended to illustrate, and not to limit the scope of the invention.

EXAMPLE

A stainless steel autoclave having an inner volume of 5 liters and provided with an anchor-shaped stirrer was charged with 750 g of petroleum pitch (softening point 200°C, nitrobenzene insoluble content 35% and H/C (atomic ratio)0.6) obtained by separation from the tar fraction produced during the thermal cracking of SERIA crude oil with steam at 2000°C 250 g of industrial grade napthalene and varying amounts (shown in Table 1 ) of a powdered metal compound were added. With the autoclave interior padded with $N_2$, the autoclave was heated to elevate its contents to 170°C and the contents were agitated at 100 r.p.m. for 60 minutes to thoroughly mix the components. After the completion of mixing 2 kg of aqueous 0.3% "Gosenol GH-17" (a partially saponified polyvinyl acetate type suspending agent made by Nippon Gosei) solution was added to the resultant molten mixture. Subsequently, the mixture was agitated at a rate of 800 r.p.m. at 170°C for 30 minutes to disperse and suspend the pitch-catalyst mixture in the form of minute droplets within the water. The suspended system thus produced was continuously agitated and quenched to solidify the dispersed droplets. After the temperature had fallen to 20°C, the agitation was discontinued and the solidified discrete particles were removed. The particles of the pitch-naphthalene-metal compound mixture thus obtained were perfect spheres having an average size of about 600$\mu$.

The minute spheres of the pitch-naphthalene-metal compound mixture were immersed in solvent naphtha and shaken overnight to extract the naphthalene component from the spheres. Removal of the naphthalene component resulted in numerous micro-pores within the minute spheres.

A rotary kiln having an inside diameter of 70 mm, was changed with 50 g spheres of the metal compound-containing pitch. The spheres were infusibilized by heating from 150° to 300°C over 10 hours as a uniform rate of temperature increase, with an air feed rate of 5 liters per minute. Because of inclusion of micro-pores extending to their innermost center, the minute spheres of metal compound-containing pitch were infusibilized uniformly throughout the entire structure.

The minute infusibilized spheres of metal compound-containing pitch thus obtained were divided into two equal parts and one part was subjected to activation with ammonia with no additional modification. The other part was first subjected to a slight degree of preliminary activation and then to activation with ammonia. The preliminary activation with steam was carried out by placing the minute infusibilized spheres of metal compound-containing pitch in a rotary kiln and heating them at 900°C for a prescribed time, with a 50/50 steam-$N_2$ mixed gas (by volume ratio) fed at a fixed flow rate (shown in Table I). The loss in weight of the spheres due to the preliminary activation was usually about 45%, although the loss varied somewhat depending on the kind and amount of metal compound used.

The activation with ammonia was carried out by placing the minute infusibilized metal compound-containing pitch spheres, either an unactivated form or in a lightly preactivated form, in a rotary kiln and heating them with simultaneous feeding of ammonia gas or a mixture of ammonia gas and nitrogen. The ammonia-activation conditions such as gas composition, activation temperature and activation time as well as the loss in weight due to ammonia-activation for this test are shown in Table 1.

Where the ammonia-activated carbon spheres obtained were not found to have a sufficiently large inner surface area, they were further subjected to a post-activation treatment using steam. The conditions for this additional treatment were the same as those for the preliminary activation.

The activated carbon spheres obtained in the various runs were tested for performance in terms of the amount of $SO_2$ adsorbed by treating a given sample of spheres with a mixed gas consisting of $SO_2$, $O_2$, $H_2O$ (steam) and $N_2$ in the proportion of 2 : 6 : 10 : 82 (by voluminal ratio) at 100°C for three hours. The durability of activated carbon spheres was rated by subjecting a given sample of spheres to a total of five cycles of adsorption, each cycle consisting of the steps of allowing the spheres to adsorb $SO_2$ up to 15 g/100 g of activated carbon, from a mixed gas of the same composition as given above, then washing the activated carbon spheres with water to elude the deposited $SO_2$ and vacuum drying the washed spheres at 120°C. Each rating was made by determining the amount of $SO_2$ adsorbed on the spheres per 3 hours of contact following the completion of the five cycles of adsorption operation and comparing the value with the $SO_2$ adsorbing capacity of the virgin activated carbon spheres. Runs No. 1 through 12 summarized in Table 1 used the activated carbon spheres of the present invention obtained by subjecting infusibilized particles of metal compound-containing pitch, either directly or after subsequent slight degree of pre-activation with steam, to activation with ammonia. For comparison, data derived from particles of pitch not containing the metal compound but subjected to a treatment with ammonia (runs 13 and 14); (2) particles of metal compound-containing pitch activated with steam (involving no activation with ammonia) (run 15) and (3) typical commercially available activated carbon (run 16) is shown in the same table.

It may be seen from Table I that the products containing no catalyst (metal compound) and treated with ammonia had lower $SO_2$ adsorbing capacity and appreciably lower durability. In contrast, it is noted that the activated carbon of the present invention, including those subjected to preliminary activation treatment and subsequent activation with ammonia, had an appreciably higher capacity for $SO_2$ adsorption and higher durability than the aforementioned commercially available activated carbon products intended for desulfurization of combustion exhaust gas. The activated carbon spheres were tested for resistance to comminution by placing a 20-ml sample in a cylindrical glass container (28 mm in diameter × 220 mm in length), rotating the container in its longitudinal direction for ten hours on a rotary shaker operated at a rate of 36 r.p.m., taking the weight of comminuted activated carbon particles passing thorugh a screen of 200 mesh and calculating the proportion of fines against the sample weight. In Runs No. 1 through 12 covering the products of this invention, the ratio of disintegration was invariably not more than 0.005% by weight. The commercially available cylindrical activated carbon (4 mm in diameter × 4 to 8 mm in length) showed disintegration ratios as high as 15% by weight.

TABLE 1 (1)

| Run No. | | Example 1 | Example of this invention Example 2 | Example 3 | Example 4 |
|---|---|---|---|---|---|
| Metal compound | Kind | CuS | FeS | NiS | CoS |
| | Amount mixed (g/100 g pitch) | 0.4 | 0.4 | 0.4 | 0.4 |
| | Gas composition (by voluminal ratio) | $H_2O/N_2$=50/50 | $H_2O/N_2$=50/50 | $H_2O/N_2$=50/50 | $H_2O/N_2$=50/50 |
| Preliminary activation | Flow rate of gas* (liter/minute) | 4 | 4 | 4 | 4 |
| | Temperature (°C) | 900 | 900 | 900 | 900 |
| | Time (hour) | 1.5 | 1.5 | 1.5 | 1.5 |
| | Gas composition (by voluminal ratio) | $NH_3$ | $NH_3$ | $NH_3$ | $NH_3$ |
| | Flow rate of gas* (liter/minute) | 0.4 | 0.4 | 0.4 | 0.4 |
| Activation with ammonia | Temperature (°C) | 900 | 900 | 900 | 900 |
| | Time (hour) | 3 | 3 | 3 | 3 |
| | Loss in weight (%) | 31 | 24 | 23 | 32 |
| | Gas composition (by voluminal ratio) | — | — | — | — |
| Post-activation | Flow rate of gas* (liter/minute) | — | — | — | — |
| | Temperature (°C) | — | — | — | — |
| | Time (hour) | — | — | — | — |
| Amount of $SO_2$ adsorbed (g/100 g of activated carbon) | Virgin (%) | 41 | 37 | 36 | 42 |
| | Spheres after 5 cycles of adsorption Operation (%) | 39 | 36 | 34 | 41 |

*The flow volume of gas fed when 50g of sample was treated in a rotary kiln 70 mm in diameter.

TABLE 1 (2)

| Run No. | | Example 5 | Example of this invention Example 6 | Example 7 | Example 8 |
|---|---|---|---|---|---|
| Metal compound | Kind | MnS | $Bi_2S_3$ | $V_2(SO_4)_3$ | $MoS_2$ |
| | Amount mixed (g/100 g pitch) | 0.5 | 0.4 | 0.5 | 0.5 |
| | Gas composition (by voluminal ratio) | — | — | $H_2O/N_2$=50/50 | $H_2O/N_2$=50/50 |
| Preliminary activation | Flow rate of gas* (liter/minute) | — | — | 4 | 4 |
| | Temperature (°C) | — | — | 900 | 900 |
| | Time (hour) | — | — | 1.5 | 1.5 |
| | Gas composition (by voluminal ratio) | $NH_3/H_2O$=75/25 | $NH_3/O_2$=95/5 | $NH_3$ | $NH_3$ |
| Activation with ammonia | Flow rate of gas* (liter/minute) | 0.4 | 0.4 | 0.4 | 0.4 |
| | Temperature (°C) | 650 | 550 | 900 | 900 |
| | Time (hour) | 8 | 8 | 3 | 7 |
| | Loss in weight (%) | 18 | 15 | 23 | 15 |
| | Gas composition (by voluminal ratio) | — | $H_2O/N_2$=50/50 | — | $H_2O/N_2$=50/50 |
| Post-activation | Flow rate of gas* (liter/minute) | — | 4 | — | 4 |
| | Temperature (°C) | — | 900 | — | 900 |
| | Time (hour) | — | 1.5 | — | 0.1 |
| Amount of $SO_2$ adsorbed (g/100 g of activated carbon) | Virgin (%) | 28 | 33 | 37 | 31 |
| | Spheres after 5 cycles of adsorption operation (%) | 27 | 31 | 34 | 30 |

*The flow volume of gas fed when 50g of sample was treated in a rotary kiln 70 mm in diameter.

TABLE 1 (3)

|  | Run No. | Example of this invention | | | |
|---|---|---|---|---|---|
|  |  | Example 9 | Example 10 | Example 11 | Example 12 |
| Metal compound | Kind | WS$_2$ | V$_2$O$_5$ | MoO$_3$ | WO$_2$ |
|  | Amount mixed (g/100 g pitch) | 0.5 | 0.3 | 0.5 | 0.5 |
|  | Gas composition (by voluminal ratio) | H$_2$O/N$_2$=50/50 | H$_2$O/N$_2$=50/50 | H$_2$O/N$_2$=50/50 | H$_2$O/N$_2$=50/50 |
| Preliminary | Flow rate of gas* (liter/minute) | 4 | 4 | 4 | 4 |
| activation | Temperature (°C) | 900 | 900 | 900 | 900 |
|  | Time (hour) | 1.5 | 1.5 | 1.5 | 1.5 |
|  | Gas composition (by voluminal ratio) | NH$_3$/N$_2$=70/30 | NH$_3$/N$_2$=70/30 | NH$_3$ | NH$_3$ |
| Activation | Flow rate of gas* (liter/minute) | 0.8 | 0.8 | 0.4 | 0.4 |
| with ammonia | Temperature (°C) | 950 | 900 | 900 | 900 |
|  | Time (hour) | 3 | 3 | 8 | 8 |
|  | Loss in weight (%) | 21 | 22 | 17 | 16 |
|  | Gas composition (by voluminal ratio) | — | — | H$_2$O/N$_2$=50/50 | H$_2$O/N$_2$=50/50 |
| Post-activation | Flow rate of gas* (liter/minute) | — | — | 4 | 4 |
|  | Temperature (°C) | — | — | 900 | 900 |
|  | Time (hour) | — | — | 1.0 | 1.0 |
| Amount of SO$_2$ | Virgin (%) | 30 | 26 | 28 | 28 |
| adsorbed | Spheres after 5 cycles of adsorption | 28 | 33 | 27 | 25 |
| (g/100 g of | operation (%) |  |  |  |  |
| activated carbon) |  |  |  |  |  |

*The flow volume of gas fed when 50g of sample was treated in a rotary kiln 70 mm in diameter.

TABLE 1 (4)

|  | Run No. | Comparative Example | | | |
|---|---|---|---|---|---|
|  |  | Comparison 13 | Comparison 14 | Comparison 15 | Comparison 16 |
| Metal compound | Kind | — | — | FeS |  |
|  | Amount mixed (g/100 g pitch) | — | — | 0.5 |  |
|  | Gas composition (by voluminal ratio) | H$_2$O/N$_2$=50/50 | H$_2$O/N$_2$=50/50 | H$_2$O/N$_2$=50/50 | Active |
| Preliminary | Flow rate of gas* (liter/minute) | 4 | 4 | 4 | carbon |
| activation | Temperature (°C) | 900 | 900 | 900 | on |
|  | Time (hour) | 1.5 | 1.5 | 2.5 | sale |
|  | Gas composition (by voluminal ratio) | NH$_3$/N$_2$=75/25 | NH$_3$ | — |  |
| Activation | Flow rate of gas* (liter/minute) | 0.4 | 0.4 | — |  |
| with ammonia | Temperature (°C) | 650 | 900 | — |  |
|  | Time (hour) | 8 | 8 | — |  |
|  | Loss in weight (%) | 4 | 5 | — |  |
|  | Gas composition (by voluminal ratio) | H$_2$O/N$_2$=50/50 | — | — |  |
| Post-activation | Flow rate of gas* (liter/minute) | 4 | — | — |  |
|  | Temperature (°C) | 900 | — | — |  |
|  | Time (hour) | 1.5 | — | — |  |
| Amount of SO$_2$ | Virgin (%) | 17 | 19 | 10 | 19 |
| adsorbed | Spheres after 5 cycles of adsorption | 11 | 12 | 8 | 19 |
| (g/100 g of | operation (%) |  |  |  |  |
| activated carbon) |  |  |  |  |  |

*The flow volume of gas fed when 50g of sample was treated in a rotary kiln 70 mm in diameter.

What is claimed is:

1. A method for the production of activated carbon spheres comprising:
   melting a pitch;
   mixing 100 parts of said pitch with 10–50 parts by weight of an aromatic solvent compatible with the pitch and 0.001 – 1 part by weight of a metal compound capable of catalyzing a reaction between said pitch and ammonia;
   shaping the resulting mixture into spheres;
   immersing said spheres in an organic solvent compatible with said aromatic solvent but lacking affinity for said pitch to extract the aromatic solvent from the spheres;
   oxidizing the spheres to infusibilize them; and
   contacting said spheres with ammonia gas or a gaseous mixture containing ammonia and a member selected from the group consisting of air, oxygen, steam, nitrogen and hydrogen at a temperature within the range of 550°–1000°C to effect a weight loss of at least 15%.

2. The method of claim 1 additionally comprising treating said spheres with steam at temperature within the range of 800°–1000°C. subsequent to contact with the oxidizing agent and prior to contact with the ammonia-contacting gas.

3. The method of claim 1 additionally comprising, subsequent to contacting with ammonia, treating the spheres with steam at a temperature within the range of 800°–1000°C.

4. The method of claim 1 wherein said aromatic solvent is selected from the groups consisting of benzene, toluene, xylene, naphthalene, tetralin, methylnaphthalene, a naphtha fraction containing naphthalene, and a BTX fraction.

5. The method of claim 1 wherein said metal compound is selected from the group consisting of sulfides, sulfates, oxides, nitrates and acetates of Fe, Co, Ni, Cu, V, Mn, Cr, Mo, W and Bi.

6. The method of claim 1 wherein said organic solvent is an alcohol or a paraffinic hydrocarbon.

7. The method of claim 6 wherein said paraffinic hydrocarbon is selected from the group consisting of hexane, haptane and light naphtha.

8. The method of claim 6 wherein said alcohol is selected from the group consisting of methanol, ethanol and propanol.

9. Discrete spheres of activated carbon formed by the method of claim 1.

* * * * *

UNITED STATES PATENT OFFICE
CERTIFICATE OF CORRECTION

Patent No. 3,909,449    Dated September 30, 1975

Inventor(s) Hirosi Nagai, Kunihiko Katori, Zenya Shiiki, and Yasuo Amagi

It is certified that error appears in the above-identified patent and that said Letters Patent are hereby corrected as shown below:

Column 2, line 1 "or" should read --of--.

Column 3, lines 16 and 17, "2. Molding the resultant molten mixture into the shape of spheres:" should start as new paragraph.

Column 3, line 30, "compounds" should be inserted before "to"; "compounds" (second) should be deleted.

Column 3, lines 39, 40 and 41, "3. Extracting the aromatic solvent from the spheres obtained as described above:" should start as new paragraph.

Column 3, line 56, "extract" should read "extractant".

Column 4, line 26, "to" (second) should be deleted; "carton" should read --carbon--.

Column 5, line 10, "To" should read --to--.

Column 5, line 38, "communication" should read --comminution--.

Column 5, line 48, "plate" should read --plant--.

Column 6, line 20, "changed" should read --charged--.

Column 6, line 22, "as" should read --at--.

Column 7, line 15, after "from" insert --(1)--.

Table 1 (2), under "Example 5" line 7, "$NH_3H_2O=75/25$" should read --$NH_3/H_2O=75/25$--.

UNITED STATES PATENT OFFICE
CERTIFICATE OF CORRECTION

Patent No. 3,909,449          Dated September 30, 1975

Inventor(s) Hirosi Nagai et al

It is certified that error appears in the above-identified patent and that said Letters Patent are hereby corrected as shown below:

Table 1 (3), under "Example 10" line 7, "$NH_3N_2=70/30$" should read --$NH_3/N_2=70/30$--.

Column 9, line 67, "contacting" should read --containing--.

Column 10, line 47, "groups" should read --group--.

Signed and Sealed this

Sixth Day of July 1976

[SEAL]

Attest:

RUTH C. MASON
Attesting Officer

C. MARSHALL DANN
Commissioner of Patents and Trademarks